US012776583B2

(12) # United States Patent
Yektakhah et al.

(10) Patent No.: US 12,776,583 B2
(45) Date of Patent: Oct. 27, 2026

(54) STEERABLE HIGH-GAIN WIDE-ANGLE LENS FOR IMAGING APPLICATIONS

(71) Applicant: Lassen Peak, Inc., North Bend, WA (US)

(72) Inventors: Behzad Yektakhah, Ann Arbor, MI (US); Ehsan Afshari, Ann Arbor, MI (US)

( * ) Notice: Subject to any disclaimer, the term of this patent is extended or adjusted under 35 U.S.C. 154(b) by 171 days.

(21) Appl. No.: 18/444,955

(22) Filed: Feb. 19, 2024

(65) Prior Publication Data

US 2024/0291164 A1 Aug. 29, 2024

Related U.S. Application Data

(60) Provisional application No. 63/448,656, filed on Feb. 27, 2023.

(51) Int. Cl.
*H01Q 15/08* (2006.01)
*H01Q 19/06* (2006.01)

(52) U.S. Cl.
CPC ........... *H01Q 15/08* (2013.01); *H01Q 19/062* (2013.01)

(58) Field of Classification Search
CPC ........ H01Q 15/02; H01Q 15/08; H01Q 15/10; H01Q 19/06; H01Q 19/062; H01Q 19/09
See application file for complete search history.

(56) References Cited

U.S. PATENT DOCUMENTS

| | | | | | |
|---|---|---|---|---|---|
| 3,886,561 | A | * | 5/1975 | Beyer | H01Q 15/02 343/910 |
| 5,675,349 | A | | 10/1997 | Wong | |
| 6,157,499 | A | * | 12/2000 | Schmidt | H01Q 19/062 359/741 |
| 2004/0233122 | A1 | | 11/2004 | Espenscheid | |
| 2007/0285327 | A1 | | 12/2007 | Paschen | |
| 2015/0357712 | A1 | | 12/2015 | Griffith et al. | |

* cited by examiner

*Primary Examiner* — Robert Karacsony

(57) ABSTRACT

An apparatus comprises a dielectric material having a first surface and a second surface with a varying thickness between the first surface and the second surface. The first surface has a substantially hyperbolic curved shape with a single vertex, and the second surface has a substantially planar shape. The combination of the substantially hyperbolic curved shape and the dielectric material is chosen to compensate for different delays in electromagnetic waves impinging the first surface and traveling through the dielectric material such that the electromagnetic waves exiting the dielectric material through the second surface after traversing the dielectric material have a phase profile either constant or varying smoothly from the center to the edge.

17 Claims, 15 Drawing Sheets

400

401

STEERABLE HIGH-GAIN WIDE-ANGLE LENS FOR IMAGING APPLICATIONS

CROSS-REFERENCE TO RELATED APPLICATIONS

This application claims priority to U.S. Provisional Patent Application No. 63/448,656, filed on Feb. 27, 2023, and titled Steerable High-Gain Wide-Angle Lens For Imaging Applications, the contents of which are hereby incorporated by reference in their entirety.

BACKGROUND

Small size (compared to wavelength) radar antenna arrays output a relatively wide beam, providing for low-resolution scanning in imaging applications. Steering the beam through a wide angle can further widen the beam, thus making the scanner less effective, in terms of resolution, than it otherwise could be. To enhance spatial resolution and increase range of the radar system, a lens can be employed in conjunction with the antenna array. Ideally, in this function, the lens will narrow the beam and maintain the beam width over a large range of scan angle.

Among different known designs for lens, Luneburg lenses are capable of beam steering by changing the position/phase center of the antenna while maintaining the lens's focus. Unfortunately, a Luneburg lens is typically spherical with a continuously changing refractive index. These characteristics make the typical Luneburg Lens both difficult and expensive to manufacture, and difficult to employ in conjunction with a planar antenna array created by one or more microchips.

FIG. 1 illustrates the original design for a Luneburg lens. It is a lens with spherical shape whose material's refractive index (which equals the square root of the dielectric constant) varies radially from $\sqrt{2}$ at the center of the sphere to 1 at the surface of the sphere. A Luneburg lens has two focal points, with one on the surface of the lens where a beam first impacts the lens (regardless of where on the surface the beam impacts, and the other at the infinity on the opposite side of the lens. If an antenna 102 is placed at any location of the lens surface, the beam 103 will be focused on the other side of the lens with a focal length at the infinity, providing a narrow beam and high spatial resolution for imaging. Because of geometrical symmetry of the lens, by rotating the antenna relative to the lens, the narrow beam is also rotated. In practice, however, since if the antenna system is planar and fixed in a position, moving the antenna on the lens spherical surface to rotate the beam is not feasible.

Thus, a need exists for a lens that is relatively flat, relatively inexpensive to manufacture, and is compatible with planar antenna arrays in applications that require beam steering.

SUMMARY

Embodiments include a lens that provides focusing. In an embodiment, the lens is a Dielectric Plano-Hyperbolic lens that can have at least one substantially flat surface. In an embodiment, the lens profile is shaped such that it compensates for different delays in the waves traveling from the source to different locations on the surface of lens facing the source to provide in-phase waves everywhere on the other side of the lens as the waves exit the lens. In an embodiment, the lens is a Dielectric Plano-Hyperbolic Lens with a profile designed for a material having a first refractive index such that it emits a beam with in-phase waves, but constructed with a material having a second refractive index such that the phase changes over the face of the beam profile, resulting in a broader beam profile.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Figure 1:
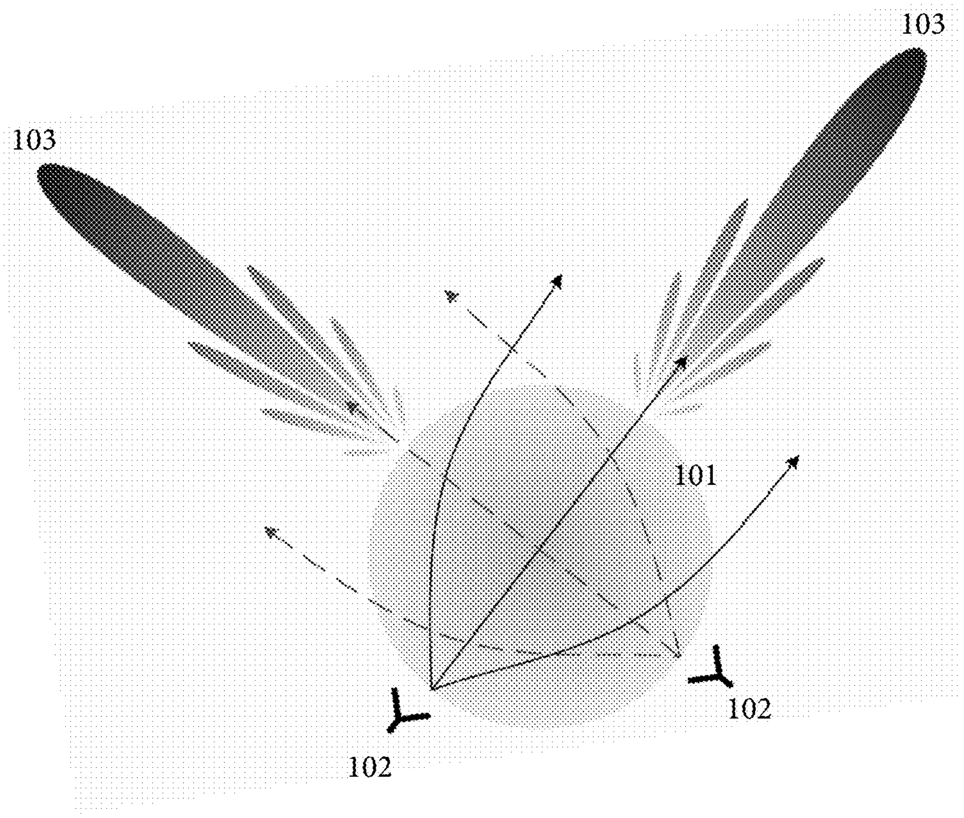
FIG. 1 is a diagram representing a prior-art embodiment of a Luneburg lens.
Figure 2:
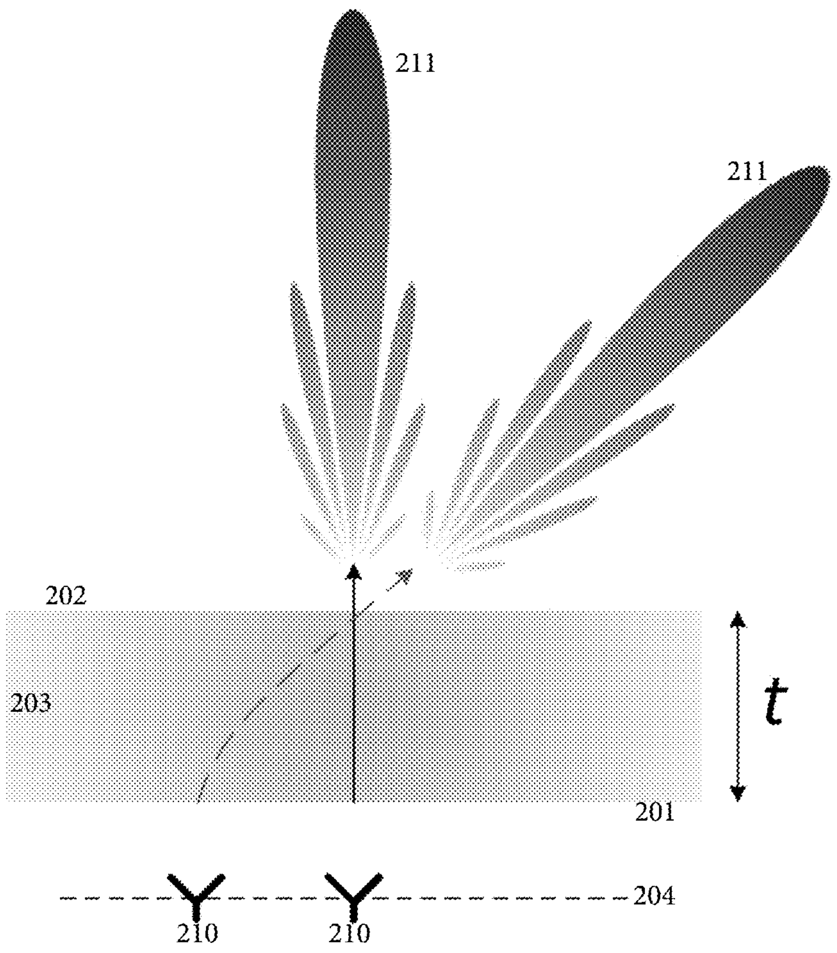
FIG. 2 is a cross-sectional diagram representing a prior art embodiment of a Luneburg-type lens with two substantially parallel flat surfaces, and with a continuously varying refractive index.

Because rotation of the beam around a spherical Luneburg lens is often not feasible, transformation electromagnetics is used to change the spherically shaped lens to a different shape that maintains the properties of a Luneburg-type lens by varying the distribution of the dielectric constant inside the lens. FIG. 2 is a cross-sectional diagram representing a prior art embodiment of a Luneburg-type lens with two substantially parallel flat surfaces 201 and 202 at bottom and top, respectively. The two flat surfaces 201 and 202 are separated by a distance t, the thickness of lens 203. In this embodiment, lens 203 has a refractive index that decreases continuously from the center of the lens (maximum value) to the edge (minimum value) as one travels along the lens parallel to the flat surfaces. The variation of the refractive index determines the location of the lens's focal points, which is located on an imaginary plane 204 parallel to the lens surface and at a distance l(0) (not shown) from the lens. One skilled in the art will appreciate that in a flat Luneburg-type lens, the focal points need not be placed on the surface of the lens. The focal points can be placed on a plane at a certain distance from the lens surface (with the other focal points are still at the infinity on the other side on the lens), allowing for flexibility in antenna array placement, although with a flat lens as illustrated in FIG. 2, the antenna should be moved on a plane to steer the beam.

Each focal point on one side of the lens has a corresponding conjugate focal point at infinity. In other words, if an antenna 210 is placed on a first focal point of the lens (close to the lens surface 201), its beam 211 emerges narrower on the other side of the lens. By moving antenna 210 in a direction parallel to flat bottom surface 201 and on the plane of focal points 204 (for example, from the center of the lens to a point to the left of center, as shown in FIG. 2), the direction of beam is rotated while its width and directivity remains substantially constant.

Figure 3:
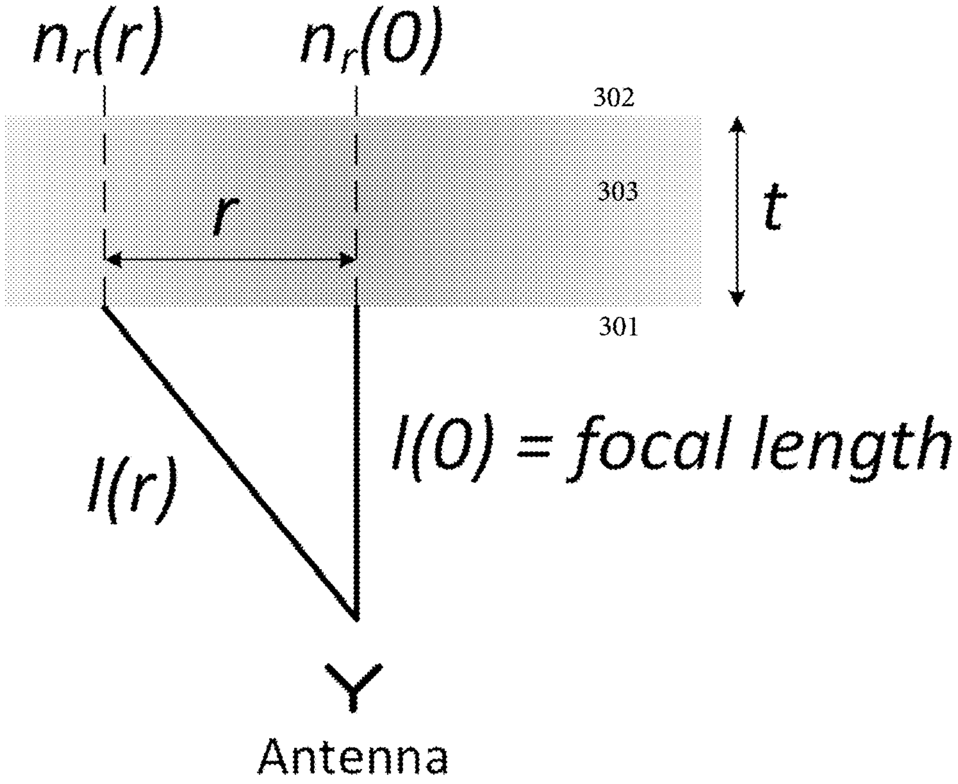
FIG. 3 is a cross-sectional diagram representing a Luneburg-type lens with two substantially parallel flat surfaces that includes parameters for modeling the refractive index, according to an embodiment of the invention.

FIG. 3 is a cross-sectional diagram representing a Luneburg-type lens 303 with two substantially parallel flat surfaces (bottom surface 301 and top surface 302), that includes parameters for modeling the refractive index, according to an embodiment of the invention. This diagram portrays substantially the same lens as displayed in FIG. 2, but provides the parameters used to model the relationship between the focal length, lens thickness, and refractive index as a function of the radial distance from the center of the lens. In this model, the refractive index of the material n(r) is shown as a function of the various parameters as follows:

$$n(r) = \frac{tn(0) + l(0) - l(r)}{t}$$

where t is the lens thickness (FIG. 3), r is the radial distance from the center, n(r) is the refractive index of the material at the distance of r from the center. l(0) is the focal length and l(r) is the distance between the focal point (which acts as a phase center) and the nearest point on the lens surface to the focal point at the radial distance r from the center. By setting (i) the maximum refractive index at center (n(0)), (ii) the focal length, and (iii) the lens thickness, the profile of refractive index n(r) can be derived using this equation. Thus, the relation between the focal length, lens thickness, and dielectric constant as a function of radial distance from the center is as follows:

$$\varepsilon_r(r) = \left(\frac{t\sqrt{\varepsilon_r(0)} + l(0) - l(r)}{t}\right)^2$$

where, t is the lens thickness (FIG. 3), r is the radial distance from the center, $\varepsilon_r(r)$ is the dielectric constant of the material at the distance of r from the center. l(0) is the focal length and l(r) is the distance between the focal point and the nearest point on the lens surface to the focal point at the radial distance of r from the center (FIG. 3). By setting the maximum dielectric constant at center ($\varepsilon_r(0)$), focal length, and the lens thickness, the profile of dielectric constant is derived.

According to this equation, one can determine the various design constraints as follows:

- r can be increased up to the point that results in n(r)=1 (or $\varepsilon_r$=1).
- Maximizing radius of the lens is preferred since it results is a larger gain and narrower beam. To increase the radius of lens:
  - maximum refractive index must be increased and/or;
  - focal length must be increased and/or;
  - lens thickness must be increased.
- Increasing maximum refractive index (or dielectric constant) increases reflection from the lens and saturates the receivers; thus, a material with lower refractive index that reduces or minimizes these problems is desired. As an example, if the material selected for the lens is Teflon®, with a refractive index of 1.45 and with very low losses at high frequencies, then analyses show less than −12 dB of reflection coefficient from the lens.
- Increasing focal length while increasing radius of the lens, may have no effect on or increase spill over loss which negatively affects the overall gain of the antenna system.
- Increasing lens thickness increases transmission loss inside the lens and reduces the gain. In some cases, a thick lens may not be practical for fabrication.

In an embodiment, the lens has discrete regions, and each region has a fixed refractive index. In an embodiment, the material selected for the lens is Teflon® with a maximum dielectric constant of 2.1 and very low losses and high frequencies. Analyses show less than −12 dB of reflection coefficient from the lens.

It may be costly or impractical to realize a continuous profile for the material's dielectric constant. It is possible to radially discretize the lens surface and within each region the dielectric constant is considered to be constant, where the refractive indices of the regions vary from the highest value at the center to the lowest value at the edges. With this configuration, the r corresponding to the center of a given discrete region is used in the equation above to find dielectric content of that region. In embodiments, different refractive indices can be achieved by (1) using different material types; (2) changing the density of the material; and (3) using periodic structures with dimensions less than the wavelength. One skilled in the art will understand that, while we are using the center as a reference point, the maximum refractive index (or maximum thickness) can be moved to a spot other than the center. In this case the lens still works but its response (beam direction) as a function of the location of antenna is not symmetric.

Figure 4:
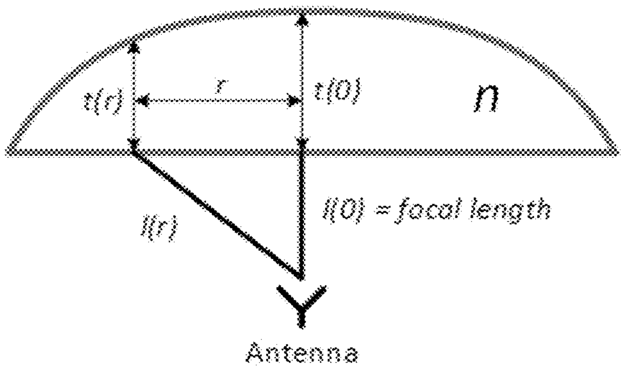
FIG. 4 is a cross-sectional view of a lens with one flat surface using the same materials, according to an embodiment.

FIG. 4 is a cross-sectional view of a discretized profiled Luneburg-type lens using the same material, according to an embodiment. In an embodiment, antenna 410 emits radiation that impinges on flat bottom surface 411 of the lens. The lens varies in thickness from the center 400 (the thickest region) to the edge 401 (the thinnest). The lens has a flat bottom surface 411 where radiation from antenna 410 impinges and then transits through the lens according to generally known electromagnetics principles and produces a narrower beam compared to the antenna output at the top of the lens. By moving antenna 410 back and forth, the narrow beam is directed to different directions while its beamwidth remains materially constant.

The refractive index changes as a function of distance from the center of the lens. The relation among the focal length, the lens thickness, and the refractive index as a function of radial distance from the center (r) is as follows:

$$t(r) = \frac{l(0) - l(r) - t(0) + t(0)n}{n - 1}$$

where, with reference to FIG. 4, t(r) is the lens thickness (as shown in FIG. 4) at the distance of r from the center, n is the refractive index of the material. l(0) is the focal length and l(r) is the distance between the focal point and the nearest point on the lens flat surface to the focal point at the radial distance of r from the center. By setting the maximum thickness at center (t(0)), focal length, and n, the thickness profile of lens, t(r), is derived using this equation. The design constraints are similar to the first design.

Alternatively, the relationship among the focal length, lens thickness, and dielectric constant as a function of radial distance from the center is as follows:

$$t(r) = \frac{l(0) - l(r) - t(0) + t(0)\sqrt{\varepsilon_r}}{\sqrt{\varepsilon_r} - 1}$$

where, t(r) is the lens thickness (as shown in FIG. 4) at the distance of r from the center, r is the radial distance from the center, $\varepsilon_r$ is the dielectric constant of the material. l(0) is the focal length and l(r) is the distance between the focal point and the nearest point on the lens flat surface to the focal point at the radial distance of r from the center (FIG. 4). By setting the maximum dielectric thickness at center (t(0)), focal length, and $\varepsilon_r$, the thickness profile of lens, t(r), is derived using this equation. The design constraints are similar to the previously described design.

Figure 5:
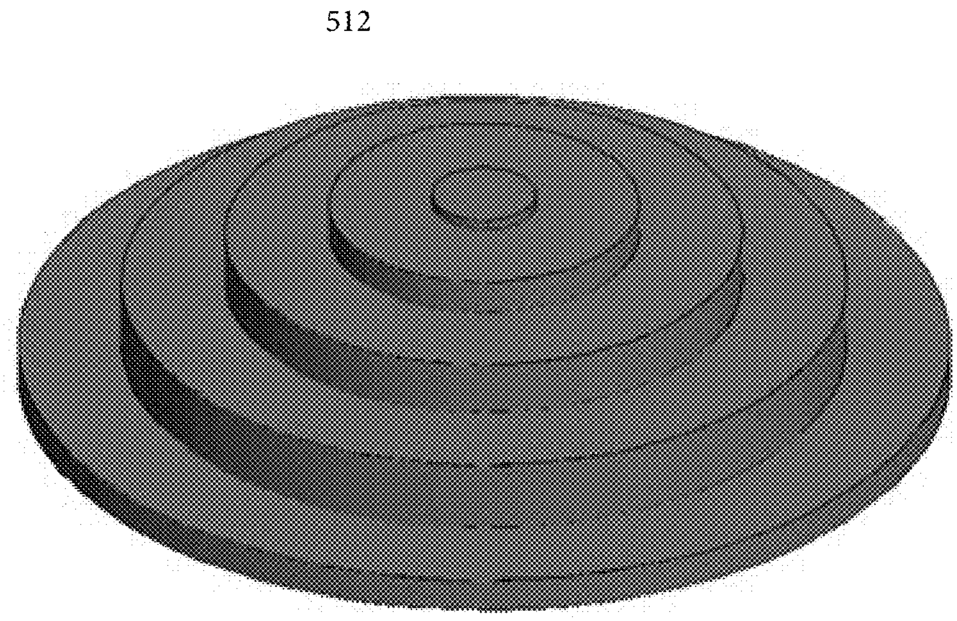
FIG. 5 is a perspective view of a disk-shaped discretized lens with one flat surface using the same materials, according to an embodiment.

Similar to the first design, instead of a continuous profile, the lens structure can be discretized and within each region the thickness is kept constant as shown in FIG. 5. Thus, in an embodiment, a lens can be realized with a single flat surface while varying the height in discrete steps above the single flat surface such that the design, while realized by a single material, varies in thickness from the center (where the thickness is maximum) to the edge (where the thickness is minimum). One skilled in the art will understand that the lens can include any number of regions of discrete thickness. FIG. 5 is a perspective view of a disk-shaped discretized lens using the same material with varying thickness, according to an embodiment. In an embodiment, the lens is realized using Teflon® with the thickness that varies from approximately 7 mm to approximately 1 mm. As in FIG. 4, the lens has a flat bottom surface (not shown) where radiation from an antenna impinges for transmission through the lens. As the radiation is swept back and forth across the flat bottom surface, it transits through the lens, and it is emitted from top surface 512 with substantially the same beamwidth but directed to different directions.

Figure 6:
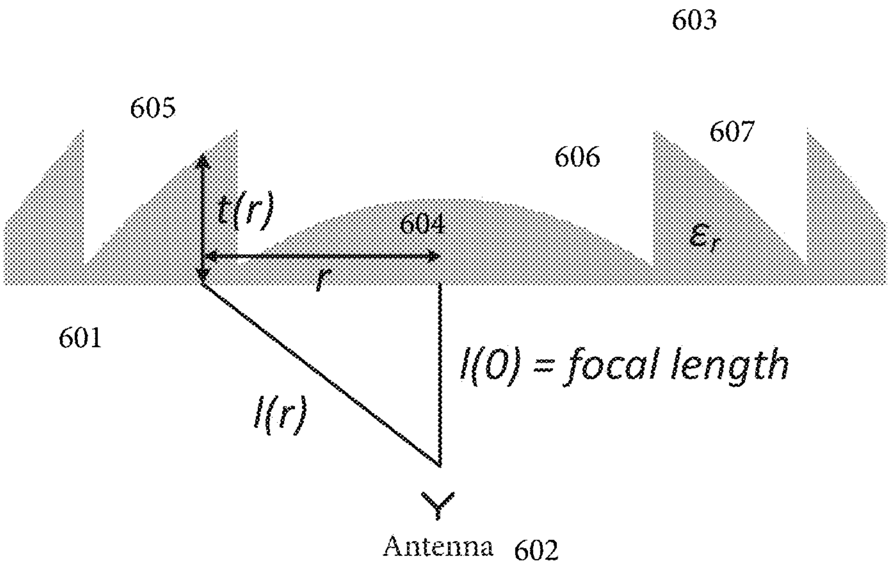
FIG. 6 is a profile view of a corrugated profiled lens, according to an embodiment.

In the discretized profiled lens shown in FIGS. 4 and 5, the lens has its maximum thickness at the center and its thickness gradually decreases to the sides. In this design, a larger radius for the lens can allow for a thicker lens that increases the overall weight and material cost of the lens and also increases signal loss at high frequencies. The largest thickness at the center means that the lens provides its maximum phase shift at the center, which may be much larger than 2π radians. In fact, at any distance r from the center of the lens, the lens may provide a phase shift larger than 2π radians. Thus, it is possible to a) remove multiple integers of 2π from the phase shift at any point to reduce the lens thickness at that point; and b) add a constant (positive or negative) value to the phase shift to all points (add a constant number to the thickness of the lens at any point of the lens surface) and still get the same performance. With these considerations in mind, FIG. 6 is a cross section of a profiled lens with a corrugated shape in which the lens's maximum thickness is bounded regardless of the maximum radius of the lens. To limit the maximum thickness of the lens the following design formula can be used:

$$t(r) = \frac{\phi(r) - \phi_0 + 2\pi}{k_0\left(\sqrt{\varepsilon_r} - 1\right)}$$

In the equation above, $k_0$ is the free space phase propagation constant, which is equal to $2\pi f/c_0$; f is the frequency of the incident wave and $c_0$ is the speed of electromagnetic waves at free space, and t(r) is the lens thickness at the distance of r from the center (as shown in FIG. 6).

$\phi(r)$ is the wrapped phase shift (bounded in the range from $-\pi$ to $+\pi$ radians) from the focal length to a point at the bottom of the lens and at distance of r from the center of the lens, which can be calculated using the equation, below:

$$\phi(r) = -k_0 l(r) + 2n\pi = -k_0\sqrt{l(0)^2 + r^2} + 2n\pi$$

In the equation above, n is any integer value that results in $\phi(r)$ in the range form $-\pi$ to $+\pi$ radians; $\phi_0$ is any number from 0 to $+\pi$ that control the maximum thickness of the lens. The term 2π in (3) results in a positive value for t(r) if $\phi_0$ is a number in the range from 0 to $+\pi$.

According to the equation for t(r), the minimum thickness ($t_{min}$) and maximum thickness ($t_{max}$) for the lens are:

$$t_{min} = \frac{\pi - \phi_0}{k_0\left(\sqrt{\varepsilon_r} - 1\right)}$$

$$t_{max} = \frac{3\pi - \phi_0}{k_0\left(\sqrt{\varepsilon_r} - 1\right)}$$

Thus, the variation in the thickness of lens ($t_{max}-t_{min}$) is independent of $\phi_0$, maximum r, and focal length and is equal to $2\pi/(k_0(\sqrt{\varepsilon_r}-1))$. The minimum possible thickness for the lens (zero) is obtained when $\phi_0$ is set the $+\pi$(radians).

In an embodiment, the lens includes a substantial flat surface 601 proximate to antenna 602, and a substantially corrugated surface 603 distal to antenna 602. Corrugated surface 603 can be considered to be a rounded surface that has been incrementally collapsed at locations radially positioned according to the formulae above that define the bounded thickness of the lens in a direction perpendicular to the radial measurement r as shown in FIG. 6. Said another way, each ridge on the corrugated surface is curved to act as a lens, but has a height t(r) as a function of its radial distance from the center of the lens such that the height can remove multiple integers of $2\pi$ radians from the phase shift at any point to reduce the lens thickness at that point.

In an embodiment, corrugated surface 603 includes central region 604 with the surface distal from antenna 602 being curved in a radially symmetric way around a center in a way that allows it to act as part of the lens. Corrugated surface 603 includes at least one ridged region 605 disposed radially symmetrically around central region 604 such that each ridged region 605 includes a second surface that is defined by a substantially vertical side 606 (as viewed in the cross section presented in FIG. 6) proximal to central region 604, and an arcuate side 607 distal to central region 604. Central region 604 and corrugated surface 603 share substantially flat surface 601. In an embodiment, central region 604 and the arcuate side 607 of the at least one ridged region are configured to work together to provide a focused beam that is steered by changing a phase center of the antenna while maintaining focus as a radar beam from antenna 602 is swept across substantially flat surface 601.

Figure 7:
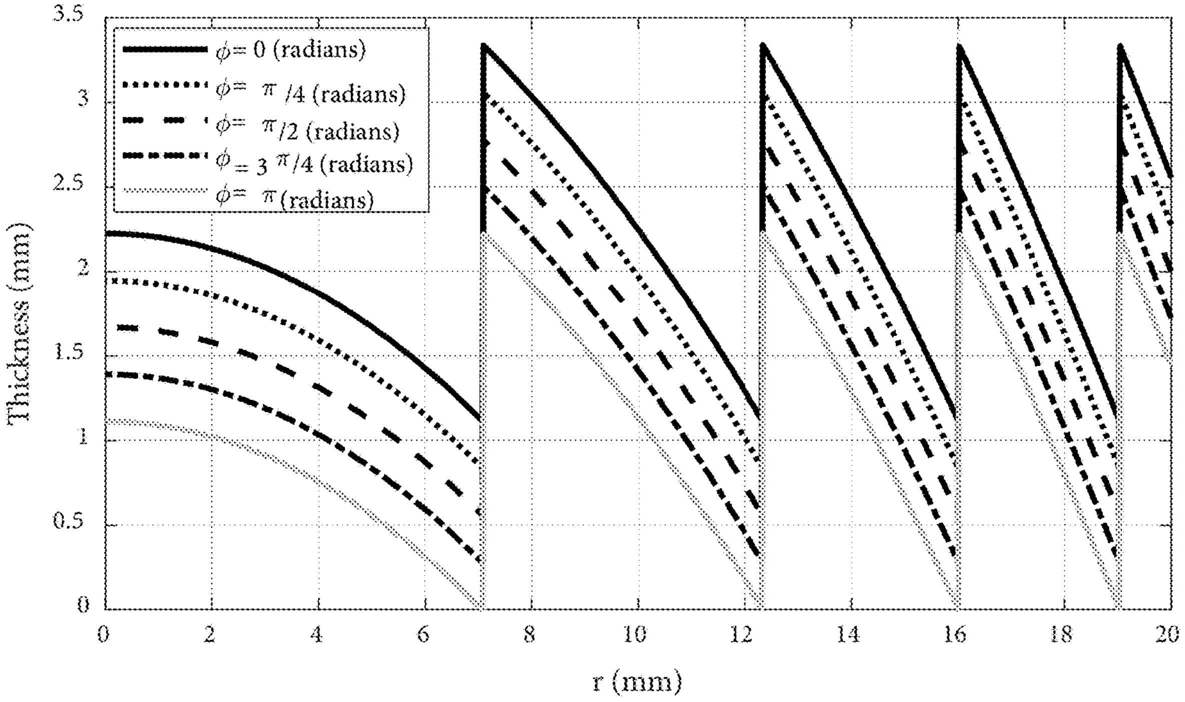
FIG. 7 shows the profile (thickness versus r) of a corrugated profiled lens, according to an embodiment.
Figure 8:
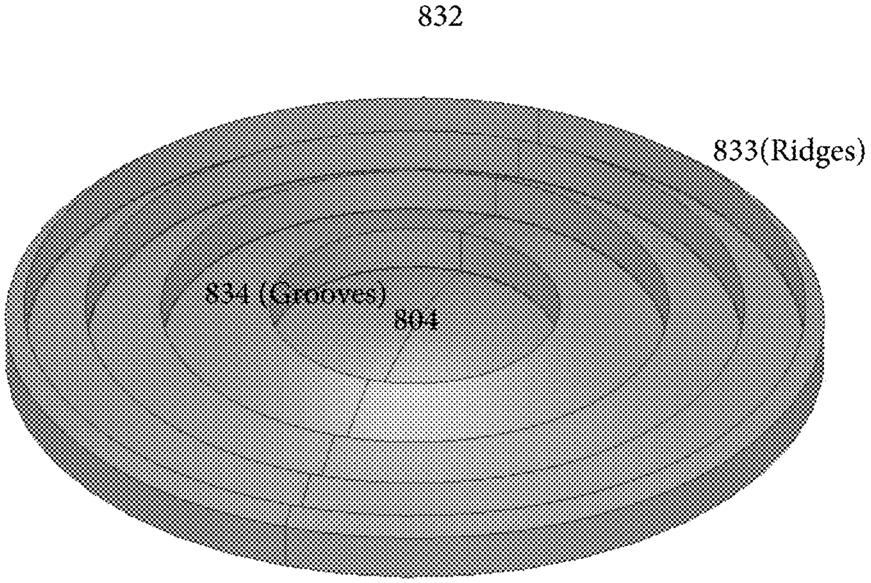
FIG. 8 shows a perspective view of a corrugated profiled lens, according to an embodiment.

FIG. 7 shows the profile (thickness versus r) of a corrugated profiled Luneburg-type lens, according to an embodiment. In this embodiment, the lens used to create the profile in FIG. 7 includes a focal length of 50 mm for different values of $\phi_0$ for a lens made of Polytetrafluoroethylene (PTFE) (Teflon®) ($\varepsilon_r$=2.1). One skilled in the art will observe that the variation in thickness is constant as $\phi_0$ varies. The frequency is set to 300 GHz. FIG. 8 shows a 3D model of an embodiment of the same lens when $\phi_0$ is set to $3\pi/4$ radians.

FIG. 8 shows a perspective view of a corrugated profiled lens, according to an embodiment. The lens includes a first substantially flat surface (not shown), and a second corrugated surface 832. With regard to the height and depth of the ridges 833 and grooves 834, the lens is substantially radially symmetric from center point 804.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Figure 9:
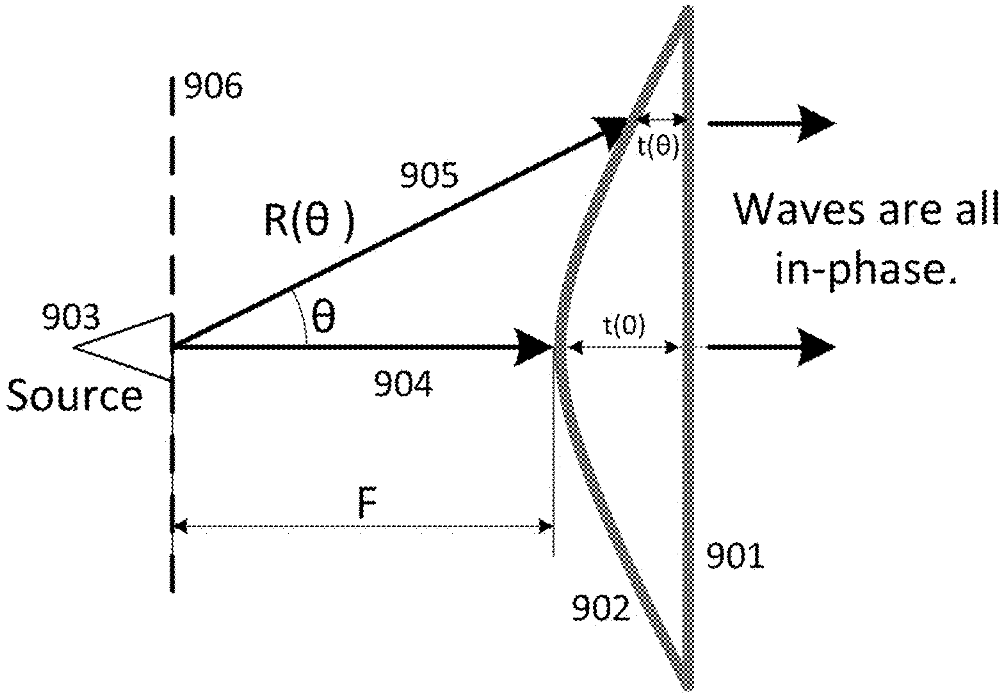
FIG. 9 is a profile view of a schematic of a Dielectric Plano-Hyperbolic Lens with a flat surface, according to an embodiment.

FIG. 9 is a profile view of a schematic of a Dielectric Plano-Hyperbolic Lens (DPHL) with a flat surface, according to an embodiment. The lens, in this embodiment, shows a flat surface 901 distal to the radiation source, and a curved surface in the shape of a hyperbola 902 proximate to the transmitting/receiving antenna 903.

Figure 10:
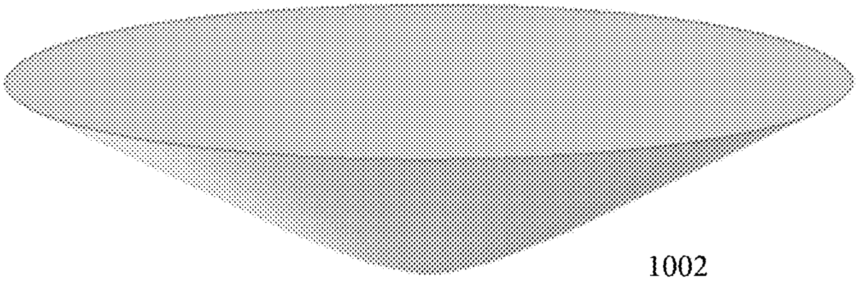
FIG. 10 is a perspective view of a Dielectric Plano-Hyperbolic Lens with a flat surface, according to an embodiment.

FIG. 10 is a perspective view of a DPHL, according to an embodiment. The lens 1000, like lens 900 in FIG. 9, is designed to be substantially circularly symmetric around a center point on the flat, or planar, side of the lens (which coincides with the maximum width of the lens at the center of the lens at t(0)), and is designed to compensate for different delays in the waves traveling from the source to different locations on the surface of lens facing the source (1002) to provide in-phase waves everywhere on the other side of the lens (1001). In FIG. 10, one can see the planar side of the lens 1001, and the curved surface of the lens 1002.

Referring back to FIG. 9, assuming two incident rays 904 and 905 on the surface of the lens, one at center and the other at angle of $\theta$, to have the same phase for both rays at the other side of the lens, the lens shape can be modelled to satisfy the following relation:

$$F + t(0)n = R(\theta) + t(\theta)n$$

where F is the focal length of the lens, n is the refractive index of the lens dielectric material, $R(\theta)$ is the distance from the source at the focal length to the surface of the lens when the ray emanates from the source at the angle of $\theta$; $t(\theta)$ is the thickness of the lens at the location where the ray with angle of $\theta$ hits the surface.

The equation above can be written as:

$$n\left(\frac{t(0) - t(\theta) + F}{R}\right) = 1 + \frac{F(n-1)}{R}$$

Using FIG. 9 as a model:

$$\cos(\theta) = \frac{t(0) - t(\theta) + F}{R}$$

The profile of the curved surface of the lens can then be calculated by:

$$R(\theta) = \frac{F(n-1)}{n\cos(\theta) - 1}$$

One skilled in the art will understand that, in designing the lens, n should not be large (approximately <1.5) to avoid large reflections from the lens surface. In an embodiment, the maximum $\theta$(which can be denoted as $\theta_{max}$) is determined by the beamwidth of the source.

Assuming at $\theta=\theta_{max}$, the thickness of the lens is modelled to be zero ($t(\theta_{max})=0$), and using the equations above, the minimum required thickness for the lens, $t(0)_{min}$, is:

$$t(0)_{min} = R(\theta_{max})\cos(\theta_{max}) - F = \frac{F(1-\cos(\theta_{max}))}{n\cos(\theta_{max}) - 1}$$

Placing the transmitting antenna at the focal point F provides the narrowest beam with the highest possible gain.

Where embodiments of the present invention are use with or as part of, for example, a radar system, if a broader beamwidth is desired (as opposed to, for example, the emitting the narrowest possible beamwidth), the beamwidth of the emitted radar beam produced by an embodiment can be increased by placing the transmitting antenna at a distance smaller than the focal length of the lens.

Embodiments of the present invention can, however, increase beamwidth using a different (or additional) technique. The equations above can be used to determine the shape for a lens have a first index of refraction; the lens can then be constructed in that shape, but by using materials have a second index of refraction smaller than the first index of refraction. For example, a lens profile can be designed using the equations above for a material with the refractive index of n with a specific focal length; if the lens with the same profile is made of a refractive index n' smaller than n (n'<n) then for an antenna placed at the same focal point (which can be set in the system design), the phase of the radar beam emitted from the antenna on the plane 901 is no longer uniform and gradually varies away from the center, while continuing to be circularly symmetric. As a result, the beam will be widened. Thus, to increase the beamwidth, the lens profile can be calculated by using a relatively large refractive index and then the lens with the calculated profile is made by a smaller refractive index material. As the beamwidth increases, the gain of radiation decreases but the lens still provides higher gain as compared to the gain of a single transmitting antenna.

This method for beam widening has the following advantages: (i) for a fixed focal length for the lens, increasing the refractive index decreases the maximum thickness for a fixed $\theta_{max}$ so the transmission loss inside the lens is reduced; and (ii) lower thickness for the lens reduces the fabrication cost.

Figure 12:
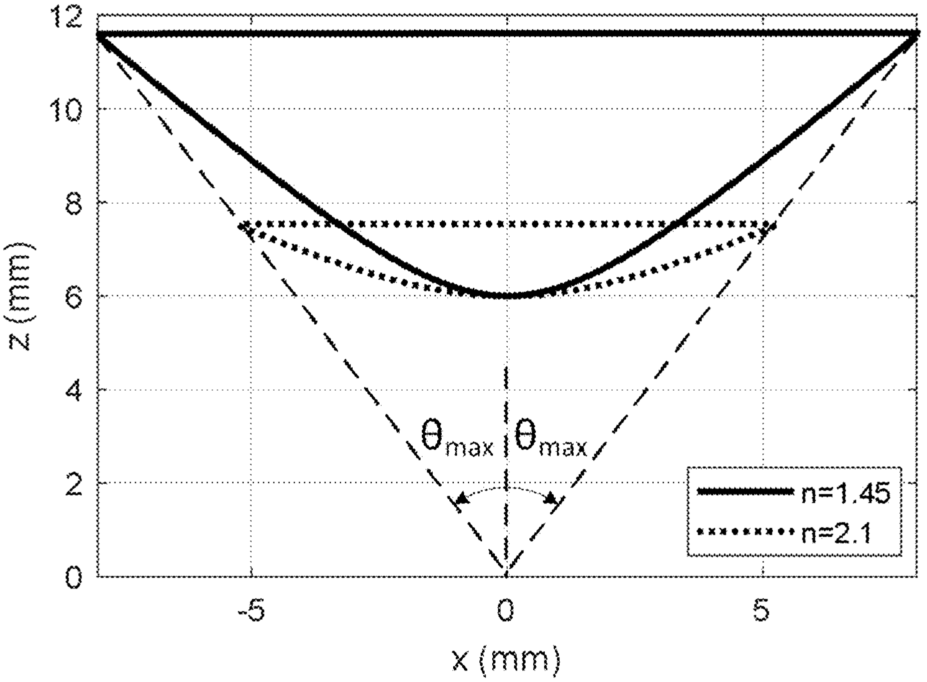
FIG. 12 is a schematic representation of a lens profile, according to an embodiment.

FIG. 12 compares the lens profile designed for n=2.1 and 1.45, where $\theta_{max}$ and F are set to 35 deg and 6 mm, respectively. In this embodiment, the higher refractive index (n=2.1) results in a smaller maximum thickness for the lens. Thus, in an embodiment, the lens is designed using the equations above with a shape determined by a material with n=2.1, but is then fabricated using a material with n'=1.45. The resulting lens will have the smaller profile as shown in FIG. 12, with a wider beamwidth that may be desirable in certain applications. Additionally, because of the smaller profile of the lens with the higher refractive index (in this embodiment, the lens with n=2.1), less space is needed, and the system may be constructed with the entire lens closer to the transmitting antenna.

Figure 13:
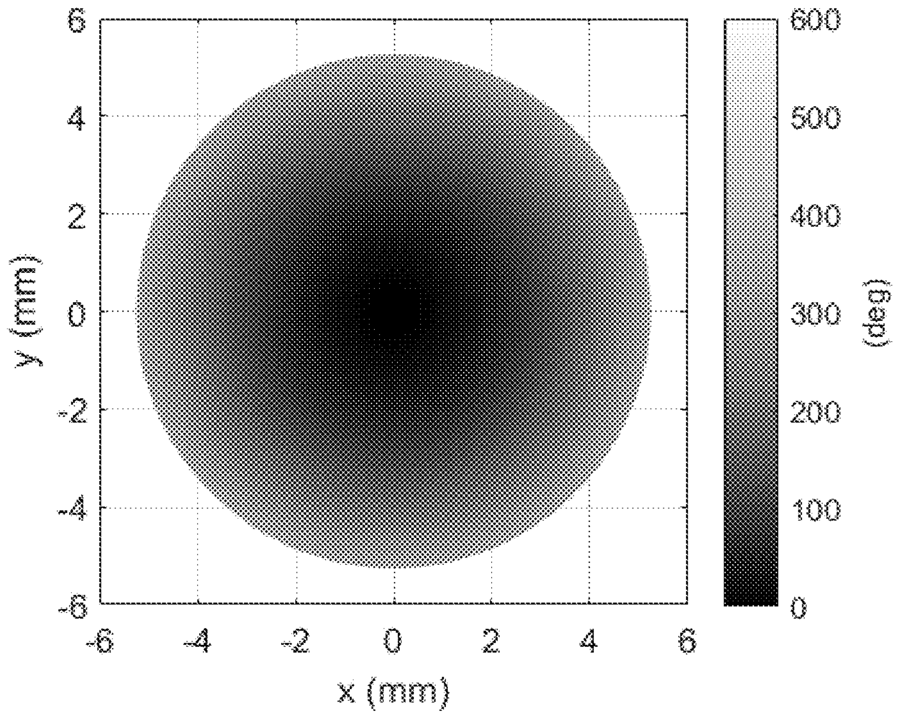
FIG. 13 displays a representation of the phase profile of the radiated fields at the flat surface of the lens, according to an embodiment.

FIG. 13 shows the phase profile of the radiated fields at the top (flat) surface of the lens (shown in FIG. 9 as 901), according to an embodiment. In this embodiment, while the lens profile is designed for n=2.1, the lens is fabricated by a material with n'=1.45. It can be observed that the phase smoothly varies away from the center while exhibiting a circular symmetry. This smooth variation instead of a constant phase profile results in widening the beam (as discussed below with regard to FIG. 11).

In this technique, the lens material still has a low refractive index, so the reflection coefficient is small and the larger value for refractive index is only used to calculate the lens profile.

Figure 11:
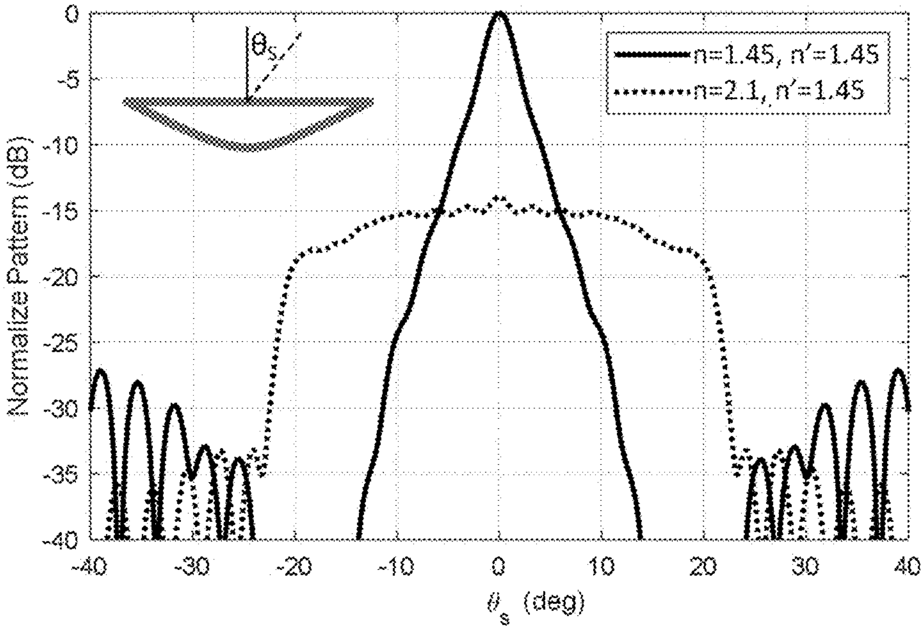
FIG. 11 is a graphical representation of radiation patterns of lenses designed for narrow and wide beams, according to embodiments.

FIG. 11 shows the focused beam profile for a Dielectric Plano-Hyperbolic Lens in two cases:

In the first case, the lens profile is designed for refractive index (n) of 1.45 and focal length (F) of 6 mm. The material used for the lens has refractive index (n') of 1.45. The antenna is placed at distance of F from the lens. This provides the maximum focusing and narrowest beam (solid line in FIG. 11).

In the second case, the lens profile is designed for refractive index (n) of 2.1 and focal length (F) of 6 mm. The antenna is placed at the distance of F=6 mm from the lens and the lens is made of a material with n'=1.45 (<n). Thus, as shown in FIG. 11, the dotted line, which represents the beam profile of the second case normalized to the peak value of the beam in the first case, is widened.

In the design with n'<n, the beam is steerable by moving the transmitting antenna away from the center and on the focal plane (906 in FIG. 9). The focal plane is a plane that passes through the focal point and is parallel to the flat surface of the lens (901 in FIG. 9).

Figure 14:
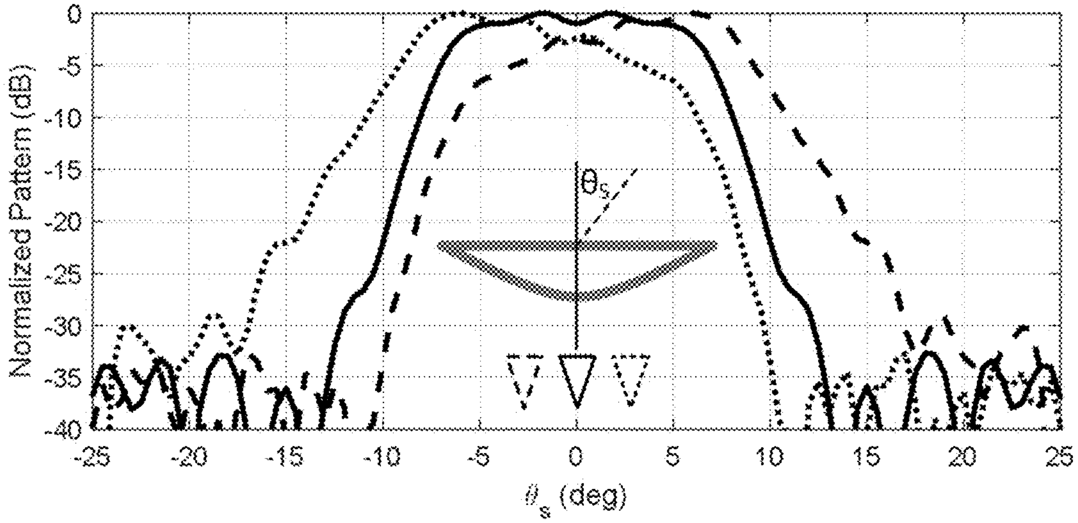
FIG. 14 shows a graphical representation of beam steerable properties of the lens, according to an embodiment.

FIG. 14 shows an embodiment where in which beam steering is achieved by moving the transmitting antenna away from the center and on the focal plane for the lens with n=1.6 and n'=1.45. The radiation patterns are shown for the transmitting antenna at the center (solid line) as well as 0.5 mm to the left (dashed line) and 0.5 mm to the right (dotted line) away from the center. In this embodiment, the transmitting antenna moves away from the center in one direction, the beam is tilted to the opposite direction.

Figure 15:
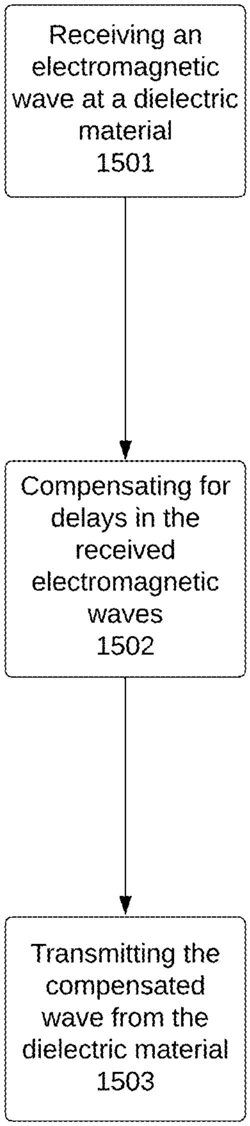
FIG. 15 is a flowchart showing a method of using a Dielectric Plano-Hyperbolic Lense with a flat surface, according to an embodiment.

FIG. 15 portrays a method of using a Dielectric Plano-Hyperbolic Lens with a flat surface, according to an embodiment. At 1401, an electromagnetic wave is received at a first surface of a dielectric material, the first surface having a hyperbolic curved shaped with a single vertex, as shown in FIG. 9. At 1402, the lens acts on the received electromagnetic waves in a way that compensates for delays in the wave as it is received at the first surface. At 1403, the compensated wave is transmitted out of the dielectric material via a second surface. If chosen according to the discussion and equations above, the combination of the shape of the dielectric material and index of refraction of the dielectric material will provide an output beam that has a shape defined by the phase profile of the waves at the flat surface of the lens. A constant phase profile provides the narrowest beam and a smoothly varying phase profile (an example is shown in FIG. 13) provides a wider beam. In an embodiment, a smoothly varying phase profile varies from a maximum at the center of the flat surface to minimum at an edge of the flat surface. In an embodiment the beam will vary smoothly across the surface to the edge, but may not have a maximum at the center (or may not have a defined physical center).

While embodiments have been discussed in the context of a transmitting antenna, the same design is valid for a receiving antenna. The design provides the same radiation properties for transmitting antenna and the receiving antenna.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

What is claimed is:

1. An apparatus comprising:

a dielectric material having a first surface and a second surface with a varying thickness between the first surface and the second surface, i. the first surface having a substantially hyperbolic curved shape with a single vertex; and ii. the second surface having a substantially planar shape across the entire second surface, where the substantially hyperbolic curved shape of the first surface, the substantially planar shape of the second surface, and properties of the dielectric material, in combination, cause electromagnetic waves that enter the dielectric material through the first surface and exit the dielectric material through the second surface to have, after exiting the second surface, a phase profile at the second surface with a center and an edge, the phase profile varying smoothly from the center to the edge;

and where the apparatus comprises a lens with a focal length;

the dielectric material has a refractive index n', and the dielectric material has a shape profile in a plane perpendicular to the second surface, the profile satisfying the equation $$R(\theta) = \frac{F(n-1)}{n\cos(\theta) - 1}$$

where:

θ is the angle of incidence of a wave ray from an electromagnetic transmitting source relative to a wave ray impacting the second surface at the center, F is the focal length, and n is a refractive index larger than n'.

2. The apparatus of claim 1, where the dielectric material has circular symmetry around a center axis normal to the substantially planar shape of the first surface and running through the single vertex of the second surface such that the dielectric material has a substantially circular cross section in a plane parallel to the first surface.

3. The apparatus of claim 1, where the dielectric material has a thickness between the first surface and the second surface that varies from a maximum thickness at a vertex of the hyperbolic shape to a minimum thickness at the edge.

4. The apparatus of claim 3, where the dielectric material is PTFE.

5. The apparatus of claim 3, where the electromagnetic wave is a radar wave, and the electromagnetic transmitting source is a radar wave transmitting antenna.

6. A method, comprising:

receiving, at a curved first surface of a dielectric material, an electromagnetic wave, compensating for delays in impingement of the electromagnetic wave at the first surface;

transmitting, through a second surface of the dielectric material, the second surface having a substantially planar shape, the electromagnetic wave, where a combination of the curved first shape, the substantially planar shape, and the dielectric material combine to compensate for the delays such that the electromagnetic waves have, after transmission through the second surface, a phase profile at the second surface with a center and an edge, the phase profile varying smoothly from the center to the edge;

and where the dielectric material comprises a lens with a focal length, the dielectric material has a refractive index n', and the dielectric material has a shape profile in a plane perpendicular to the cross section, the profile satisfying the equation $$R(\theta) = \frac{F(n-1)}{n\cos(\theta) - 1}$$

where:

θ is the angle of incidence of a wave ray from an electromagnetic transmitting source relative to a wave ray impacting the second surface at the center, F is the focal length, and n is a refractive index larger than n'.

7. The method of claim 6, where the curved first surface has a substantially hyperbolic curved shape with a single vertex.

8. The method of claim 6, where the dielectric material has circular symmetry around a center axis normal to the substantially planar shape of the first surface and running through the single vertex of the second surface such that the dielectric material has a substantially circular cross section in a plane parallel to the first surface.

9. The method of claim 8, where the dielectric material has thickness between the first surface and the second surface that varies from a maximum thickness at a vertex of the hyperbolic shape to a minimum thickness at the edge.

10. The method of claim 9, where the dielectric material is PTFE.

11. The method of claim 9, where the electromagnetic wave is a radar wave, and the electromagnetic transmitting source is a radar wave transmitting antenna.

12. A method, comprising:

receiving, at a first surface of a dielectric material, an electromagnetic wave, where the first surface of the dielectric material is one of a curved surface or a substantially planar surface;

transmitting, through a second surface of the dielectric material, the electromagnetic wave, where the second surface of the dielectric material is substantially planar when the first surface is curved, or is curved when the first surface is substantially planar;

compensating for delays in impingement of the electromagnetic wave at the first surface;

where a combination of the curved surface, the substantially planar surface, and the dielectric material combine to compensate for the delays such that the electromagnetic waves have, after transmission through the second surface, a phase profile at the second surface with a center and an edge, the phase profile varying smoothly from the center to the edge;

and where the dielectric material comprises a lens with a focal length, the dielectric material has a refractive index n', and the dielectric material has a shape profile in a plane perpendicular to the cross section, the profile satisfying the equation $$R(\theta) = \frac{F(n-1)}{n\cos(\theta) - 1}$$

where:

θ is the angle of incidence of a wave ray from an electromagnetic transmitting source relative to a wave ray impacting the second surface at the center, F is the focal length, and n is a refractive index larger than n'.

13. The method of claim 12, where the curved surface has a substantially hyperbolic curved shape with a single vertex.

14. The method of claim 12, where the dielectric material has circular symmetry around a center axis normal to the substantially planar shape and running through the single vertex of the curved surface such that the dielectric material has a substantially circular cross section in a plane parallel to the substantially planar surface.

15. The method of claim 14, where the dielectric material has thickness between the first surface and the second surface that varies from a maximum thickness at a vertex of the hyperbolic shape to a minimum thickness at the edge.

16. The method of claim 14, where the dielectric material is PTFE.

17. The method of claim 14, where the electromagnetic wave is a radar wave, and the electromagnetic transmitting source is a radar wave transmitting antenna.

* * * * *